United States Patent [19]

Hataura et al.

[11] Patent Number: 4,798,183

[45] Date of Patent: Jan. 17, 1989

[54] SWIRL CHAMBER TYPE COMBUSTION CHAMBER FOR DIESEL ENGINE

[75] Inventors: Kiyoshi Hataura; Masahiro Nagahama, both of Osaka, Japan

[73] Assignee: Kubota Ltd., Osaka, Japan

[21] Appl. No.: 53,338

[22] Filed: May 21, 1987

[30] Foreign Application Priority Data

May 23, 1986 [JP] Japan .................. 61-119682

[51] Int. Cl.[4] .............................................. F02F 3/26
[52] U.S. Cl. ........................... 123/279; 123/286; 123/193 P
[58] Field of Search ........... 123/269, 286, 193 P, 123/281, 279, 285

[56] References Cited

U.S. PATENT DOCUMENTS

| 1,917,883 | 7/1933 | Goldberg | 123/286 |
|---|---|---|---|
| 2,803,229 | 8/1957 | Schwaiger | 123/279 |
| 2,816,534 | 12/1957 | French | 123/279 |
| 3,063,434 | 11/1962 | Haas | 123/269 |
| 3,263,659 | 8/1966 | Francois | 123/269 |
| 3,398,726 | 8/1968 | Bricout | 123/269 |
| 3,924,580 | 12/1975 | Taira et al. | 123/193 P |
| 3,965,872 | 6/1976 | Taira et al. | 123/193 P |
| 4,108,116 | 8/1978 | Ohta | 123/279 |
| 4,619,229 | 10/1986 | Imoto et al. | 123/269 |
| 4,662,330 | 5/1987 | Shioyama et al. | 123/269 |

FOREIGN PATENT DOCUMENTS

| 133793 | 6/1933 | Fed. Rep. of Germany | 123/269 |
|---|---|---|---|
| 854716 | 7/1949 | Fed. Rep. of Germany | 123/286 |
| 425908 | 2/1947 | Italy | 123/286 |
| 481985 | 11/1951 | Italy | 123/269 |
| 0029512 | 3/1977 | Japan | 123/269 |
| 0025709 | 3/1978 | Japan | 123/269 |
| 0075528 | 6/1980 | Japan | 123/269 |
| 57-59410 | 12/1982 | Japan . | |
| 0051215 | 3/1983 | Japan | 123/286 |
| 0126421 | 7/1983 | Japan | 123/279 |
| 0018225 | 1/1984 | Japan | 123/285 |
| 0158315 | 9/1984 | Japan | 123/279 |
| 930498 | 7/1963 | United Kingdom | 123/269 |
| 2118622 | 11/1983 | United Kingdom | 123/286 |

Primary Examiner—Charles J. Myhre
Assistant Examiner—David A. Okonsky
Attorney, Agent, or Firm—Lowe, Price, LeBlanc, Becker & Shur

[57] ABSTRACT

In a swirl chamber type combustion chamber for a diesel engine having an injection passage provided for to guide the stream of combustion gas gradually spreading right and left during the injection from the swirl chamber to the main combustion chamber, a top surface of a piston head is provided with a concavity formed in such a configuration as gradually spreading right and left as progressing from the inlet end to the outlet end thereof, for example like an unfolded-fan. And the inlet end of the concavity is located so as to face to the outlet of the injection passage. The stream of combustion gas injected from the injection passage is to be guided so as to be sufficiently diffused in the main combustion chamber by the concavity.

15 Claims, 4 Drawing Sheets

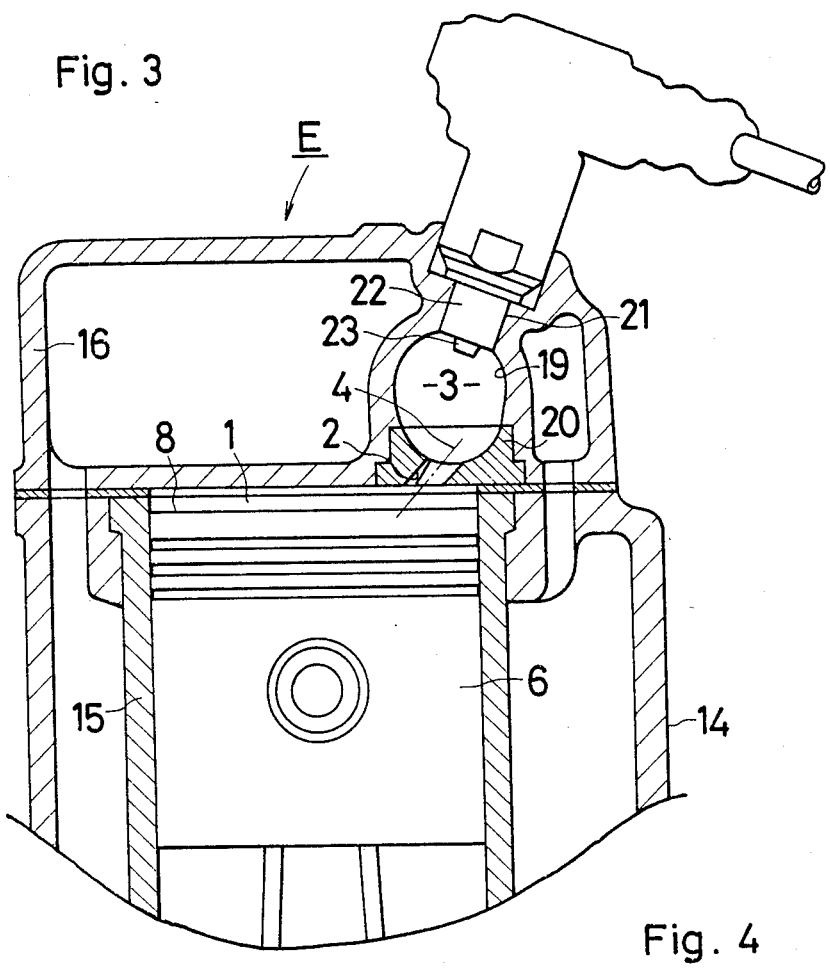
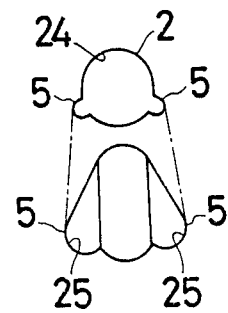
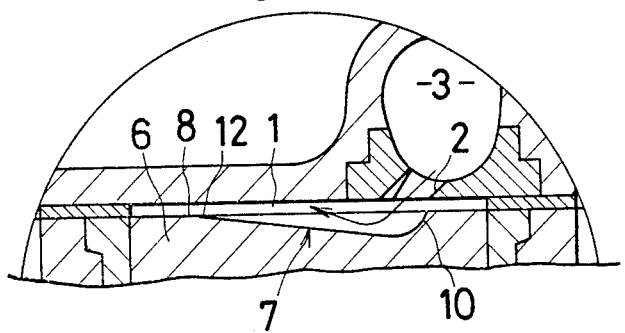

SWIRL CHAMBER TYPE COMBUSTION CHAMBER FOR DIESEL ENGINE

BACKGROUND OF THE INVENTION

1. Field of the invention

The present invention relates to an improvement of a swirl chamber type combustion chamber for a diesel engine in which a stream of combustion gas is injected from a swirl chamber to a main combustion chamber so as to spread out right and left.

2. Prior Art

A basic construction of a swirl chamber type combustion chamber for a diesel engine, which being concerned in the present invention, is as described hereinafter. Referring to FIG. 3, at an offset position relative to a main combustion chamber 1 in a diesel engine, there is provided a swirl chamber 3 which is in communication with the main combustion chamber 1 through an injection passage 2, the axis 4 of which is directed in such an oblique direction as it gets near the center of the main combustion chamber as progressing from the swirl chamber 3 to the main combustion chamber 1. The injection passage 2 is formed in such a shape as it spreads the right and left portions of the stream of combustion gas expanded in the swirl chamber 3, at a spread angle towards the main combustion chamber.

Generally, it is known in the art that an injection passage which is simply formed in a cylindrical shape can not enhance a specific air utilization in the swirl chamber type combustion chamber because the combustion gas stream doesn't spread so widely in the main combustion chamber 1 when it is injected thereinto through the passage 2 from the swirl chamber 3.

Therefore, the applicant( the assignee ) of the present invention has disclosed in Japanese Patent Publication of No. 59410 of 1982 an improved injection passage that is formed in such a shape as it spreads gradually at the both sides thereof towards the main combustion chamber 1 like a diffuser in order to enhance the diffusion of the combustion gas stream and then the specific air utilization. That is, the injection passage 2 comprises a round through hole and a pair of swelled side channels connected thereto on both sides thereof. Accordingly, the injection passage 2 is adapted to produce a main stream of combustion gas along the axis 4 thereof as well as right and left sub-streams of combustion gas spread out to both sides of the main stream like an unfolded fan when the combustion gas stream is injected onto a flat top surface of a piston head ascended near the top dead center in order that the specific air utilization may be enhanced.

On the other hand, in order to enhance the swirl mixing efficiency in the swirl chamber, since it is necessary that the volume of the swirl chamber 3 might be enlarged possibly and that of the main combustion chamber 1 might be reduced possibly, the top clearance above the piston is narrowed extremely at the top dead center of the piston.

Thereupon in the above-mentioned prior art, the injection passage 2 is almost closed by the flat top surface of the piston while the piston passes by the top dead center thereof. Hence, it becomes impossible owing to the large resistance at the outlet of the injection passage 2 for the stream of combustion gas expanded in the swirl chamber 3 to flow smoothly, properly and forwardly into the main combustion chamber 1, and further the stream of combustion gas injected thereinto is apt to be disturbed by the excessive spread thereof to both right and left sides, for example over an angle of ab. 120 degree in comparison with an ideal spread angle of 60 degree at the top dead center of the piston. Thus, since the stream of combustion gas can't mix uniformly with air which exists in a forward portion thereof, the operating characteristics of the engine, such as, for example, power and specific fuel consumption are made worse owing to the poor air utilization.

Further, since the fuel-air mixture in the right and left portions of the combustion gas stream generated by the excessive spread thereof becomes too rich to ensure the complete combustion, carbon deposits produced there are apt to cause piston-ring stickings or scuffings. Moreover, since the positions where the carbon deposit is produced are near the sliding surfaces of the piston and the cylinder, the deposit is apt to drop therebetween and cause sticking. And since the stream of combustion gas is obstructed as described above and the portions adjacent to the injection passage are heated locally so as to cause uneven heating in the combustion chamber, thermal strains are apt to be generated in the piston.

SUMMARY OF THE INVENTION

It is therefore an object of the present invention to improve the diffusion of the stream of combustion gas in a main combustion chamber while a piston passing by the top dead center thereof and to enhance a specific air utilization therein.

It is another object of the present invention to solve lack of air caused locally in a main combustion chamber and to prevent the generation of carbon deposit and a piston-ring sticking.

It is further another object of the present invention to alleviate thermal strains produced in a piston.

In accordance with the present invention, in a swirl chamber type combustion chamber for a diesel engine including an injection passage which guides a stream of combustion gas injected into a main combustion chamber so as to spread right and left therein, there is provided a concavity formed in the upper surface of the piston in such a shape as it gradually spreads right and left as progressing from its inlet end to the outlet end. And as the inlet end of the concavity is located so as to face to the outlet of the injection passage, the concavity functions to guide the stream of combustion gas injected into the main combustion chamber to mix well with air therein when the piston reaches near the top dead center thereof.

In this case, the concavity may be overlapped partially with valve recesses provided for preventing interferences between the piston head and an intake and an exhaust valves.

Further, the concavity may be formed in such figures as gradually becoming shallower as progressing from the inlet end to the outlet end as well as having the central portion made deepest.

The foregoing and other objects and attendant advantages of the present invention will be readily appreciated as the same becomes better understood by reference to the following detailed description when considered by the accompanying drawings, wherein:

BRIEF DESCRIPTION OF THE DRAWINGS

FIG. 2 is a vertical sectional right side view showing the principal parts of a main combustion chamber and a swirl chamber for a vertical diesel engine according to the present invention;

FIG. 3 is a vertical sectional right side view showing the principal part including a cylinder block and a cylinder head for the vertical diesel engine;

FIG. 4 is an explanatory view of an injection passage formed in a mouthpiece in FIG. 3;

FIG. 14 is a vertical sectional view of the piston head in accordance with the second embodiment;

FIG. 15 is a view in accordance with the third embodiment and in correspondence with FIG. 13;

FIG. 16 is a view in accordance with the fifth embodiment and in correspondence with FIG. 13;

FIG. 17 is a view in accordance with the fourth embodiment and in correspondence with FIG. 13;

FIG. 18 is a plan view of the concavity showing the state wherein both directions are in accord each other;

FIG. 19 is a plan view of the concavity showing the state wherein both directions are shifted longitudinally to each other;

FIG. 20 is a plan view of the concavity showing the state wherein the spreading angle of the concavity is larger than that of the combustion gas stream;

FIG. 21 is a view of the injection passage comprising a main passage of an elliptic cylinder and side channels connected therewith, in correspondence with FIG. 4;

FIG. 22 ia a view showing the injection passage having a small elongate hole at the upper end and a large elongate hole at the lower end, whose longitudinal directions are coincide each other, in correspondence with FIG. 4;

FIG. 23 is a view showing the injection passage having an elongate hole at the upper end and a circular hole at the lower end, in correspondence with FIG. 4; and FIG. 24 is a view of the passage having a small elongate hole at the upper end and a large elongate hole at the lower end, whose longitudinal directions are crossed each other, in correspondence with FIG. 4.

DESCRIPTION OF THE PREFERRED EMBODIMENT

Figure 1:
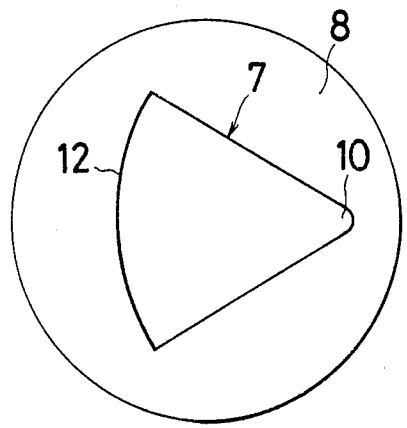
FIG. 1 is a plan view of a piston head showing the first embodiment of the present invention.

As shown in FIGS. 1 through 4, in the preferred embodiment of the present invention, a diesel engine E has a cylinder block 14 provided with a cylinder 15 around the center thereof, which guides a piston 6 slidably reciprocatingly therein. On the upside of the cylinder block 14, there is mounted a cylinder head 16, which has a cavity caved in the backward wall facing to a main combustion chamber 1 and a mouthpiece 20 fitted in the aperture formed in the lower portion of the cavity 19. A swirl chamber 3 is formed by the upper hemispherical portion of the cavity 19 and the lower hemispherical portion caved in the mouthpiece 20.

The cylinder head 16 has a fuel injection nozzle 22 mounted in a bore 21 which is bored through from the upper end of the backward wall to the cavity 19 therein with the injection tip 23 being projected in the swirl chamber 3.

In the mouthpiece 20, there is provided an injection passage 2 inclined backward, that is directed obliquely in such a way that the axis 4 of the injection passage 2 gets near the center of the main combustion chamber 1 as progressing to the main combustion chamber 1 from the swirl chamber 3.

As shown in FIG. 4, the injection passage 2 comprises a central round through hole 24 as for a main injection channel and side channels 25 in the shape of a swelled ridge connected thereto at somewhat forward positions from the transverse axis of the hole 24. The side channels 25 are formed in such configuration that the opposite side walls thereof spread right and left symmetrically relative to the axis of the round through hole 24 as progressing to the main combustion chamber 1 from the swirl chamber 3 and so that the combustion gas is guided to spread to both side thereof when it is injected from the swirl chamber 3 to the main combustion chamber 1.

With referrence to FIGS. 1 and 2, on the top surface of the piston head 8, there is provided a concavity 7 in a shape of a fan unfolded to an angle of ab. 60 degree so as to face to the outlet of the injection passage 2 at the inlet end 10 corresponding with the pivot portion of the fan. The concavity 7 is formed deepest at the inlet end 10 thereof and so as to get shallower as progressing to the forward end 12 as for the outlet end. Further, since the cavity 7 is positioned around at the central portion of the piston top surface so as for the inlet end 10 to face to the outlet of the injection passage 2 in the main combustion chamber 1, the stream of combustion gas injected from the passage 2 is guided to spread smoothly and properly throughout the concavity 7 from the inlet end 10 to the outlet end 12 thereof.

The longitudinal sectional configuration of the concavity 7 comprises a spherical portion formed at the inlet end 10 and a single-curved surface (having not a curvature longitudinally but having that transversely) formed like a ramp ascending from the inlet end 10 to the outlet end 12 and smoothly connected thereto.

The function of the above-mentioned embodiment is now to be described hereinafter.

Since the injection passage 2 is directed towards the inlet end 10 of the concavity 7 formed on the piston head 8 even while the piston 6 is passing by the top dead center thereof, the stream of combustion gas injected into the main combustion chamber 1 through the passage 2 pushes away the air in the concavity 7 towards the outlet end 12 smoothly without any resistances and also the stream of combustion gas is not spread excessively by the approach of the piston top surface to the outlet of the passage 2. Thereupon, the stream of combustion gas can be diffused properly without causing turbulences in the main combustion chamber 1 in order to mix with the air effectively throughout the main combustion chamber 1.

Accordingly, the present invention can obtain the following advantages.

(1) Since the stream of combustion gas injected from the swirl chamber 3 is diffused properly without causing turbulences in the main combustion chamber 1 so as to facilitate the mixing with the air effectively throughout the chamber 1, a specific air utilization can be enhanced.

(2) Since a local shortage of the air in the main combustion chamber 1 can be solved by the improvement of the diffusion of the combustion gas stream, carbon is scarcely produced therein. Thus, the sticking of the piston-rings can be prevented effectively between the sliding surfaces of the cylinder 15 and the piston 6.

(3) Since the stream of combustion gas is smoothly injected forwardly in the main combustion chamber 1 even while the piston is passing by the top dead center thereof, the local overheating for the piston head 18 by the combustion gas maldistributed near the outlet of the passage 2 can be prevented so as for the thermal strains in the piston 6 to be removed.

In addition, modified embodiments are now to be described hereinafter.

That is, since it is required as a necessary condition that the concavity 7 is to be formed in such a configuration as spreading right and left as progressing from the inlet end 10 to the outlet end 12, the longitudinal sectional configuration thereof is not limited exclusively to the abovementioned embodiment but may be modified as follows.

Figure 5:
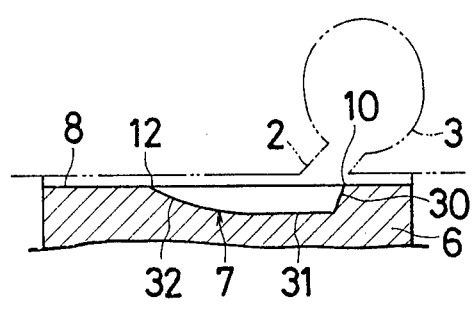
FIG. 5 is a vertical sectional right side view of a piston head showing the second embodiment of the present invention.

In the second embodiment of the concavity 7 provided in the piston head 8 as shown in FIG. 5, the concavity 7 comprises an oblique flat surface 30 inclined backwards at the inlet end 10, a horizontal flat surface 31 formed in a same depth from the inlet end 10 to the midway portion thereof and a single-curved concave 32 (having a curvature longitudinally) ascending from the midway portion to the outlet end 12 and connected smoothly to the flat surface 31.

In this embodiment, since the concavity 7 has a larger capacity due to the formation of the concave 32 in comparison with that of the first embodiment, an excessive spreading of the stream of combustion gas can be prevented effectively.

Figure 6:
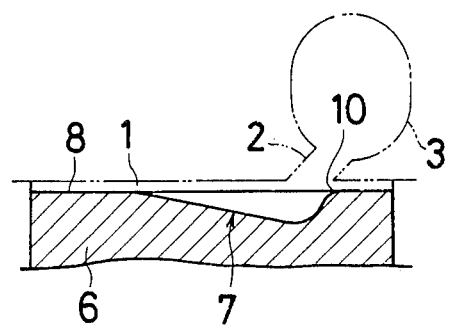
FIG. 6 is a view showing the third embodiment in correspondence with FIG. 5.

In the third embodiment of the concavity 7 shown in FIG. 6, the edge between the flat surface 30 and the piston top surface at the inlet end 10 as shown in the first embodiment is smoothly rounded so as to continuously smoothly connect the cavity 7 to the top surface of the piston head 8. Therefore, the generation of cracks and/or a heat point can be prevented owing to the removal of the sharp edge at the inlet end 10.

Figure 7:
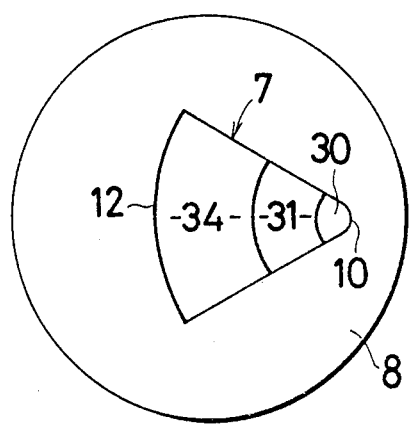
FIG. 7 is a view showing the fourth embodiment in correspondence with FIG. 1.
Figure 8:
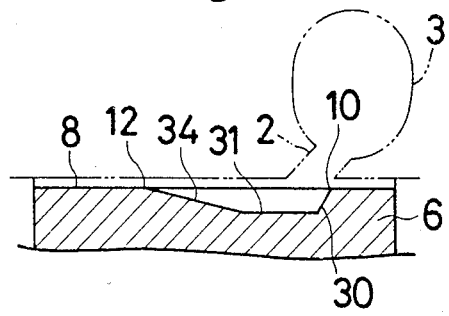
FIG. 8 is a view showing the fourth embodiment in correspondence with FIG. 5.

In the fourth embodiment of the concavity 7 shown in FIGS. 7 and 8, the area from the midway portion to the outlet end 12 of the concavity 7 in the third embodiment is formed in an oblique single-curved concave 34 having a curvature transversely and ascending forwardly, and the central flat surface 31 and the concave 34 are connected to each other like a folded line.

Figure 9:
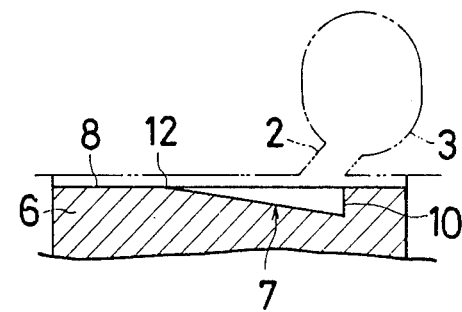
FIG. 9 is a view showing the fifth embodiment in correspondence with FIG. 5.

In the fifth embodiment of the concavity 7 shown in FIG. 9, the inlet end 10 shown in the first embodiment is modified so as to be formed by a vertical flat surface.

Figure 10:
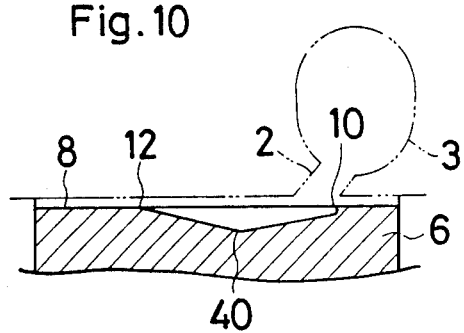
FIG. 10 is a view showing the sixth embodiment in correspondence with FIG. 5.

In the sixth embodiment of the concavity 7 shown in FIG. 10, the midway portion 40 between the inlet end 10 and the outlet end 12 is formed deepest. Thereupon, the concavity 7 is formed so as to progressively descend from the inlet end 10 to the midway portion 40 and ascend from the midway portion 40 to the outlet end 12. The flow resistance for the stream of combustion gas injected from the injection passage 2 can be reduced effectively because the depth of the concavity 7 gets gradually increased as progressing from the inlet end 10 to the midway portion 40.

Figure 11:
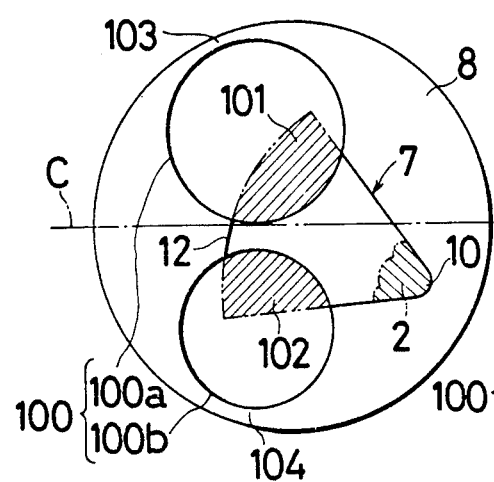
FIG. 11 is a view showing the seventh embodiment including a piston head provided with vale recesses, in correspondence with FIG. 1.
Figure 12:
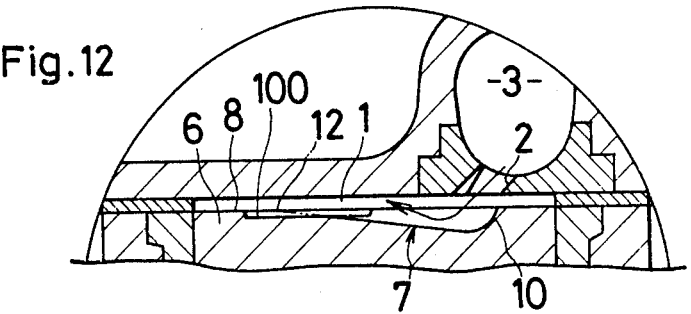
FIG. 12 is a view showing the seventh embodiment in correspondence with FIG. 2.

In the seventh embodiment shown in FIGS. 11 and 12, the piston head 8 is provided with valve recesses 100 in order to avoid the interferences between the piston head 8 and an intake and an exhaust valves. The intake valve recess 100a of large aperture and the exhaust valve recess 100b of small aperture are respectively formed in a proper depth at the left side and at the right side of a center line C on the piston head 8.

In this case, the intake valve recess 100a is overlapped partially with the right half around the outlet end 12 (overlapped part being indicated by 101), and the exhaust valve recess 100b is overlapped partially with the left half around the outlet end 12 (overlapped part being indicated by 102).

The longitudinal sectional configuration of the concavity 7 comprises a spherical inlet end 10 and an oblique flat surface ascending from the inlet end 10 to the outlet end 12 and connected smoothly thereto.

Generally, as the compression ratio and the volume ratio of the swirl chamber being constant, the volume of the main combustion chamber 1 is also defined to be constant. And the volume of the main combustion chamber 1 consists of respective volumes of a disk-like clearance between the underside of the cylinder head 16 and the top surface of the piston head 8, the valve recesses 100 and the concavity 7. Further, as the volume of the cylindrical clearance and the volume of the valve recess are respectively defined to be constant by the clearance at the top dead center of the piston 6 for the former and by the strokes of the intake and exhaust valves for the latter, the residual volume of the concavity 7 is to be defined constant unconditionally.

In this embodiment, since the volume of the concavity 7 is reduced by the overlapped portions thereof, the concavity 7 is to be deepened as compensation for the overlapped portions in order to maintain the constant volume of the concavity 7. Thereupon, the resistance for the combustion gas stream is reduced remarkably in the concavity 7. Accordingly, the excessive spreading of the combustion gas stream can be prevented more effectively than in the foregoing embodiments owing to the space enlarged at the outlet of the injection passage 2.

Figure 13:
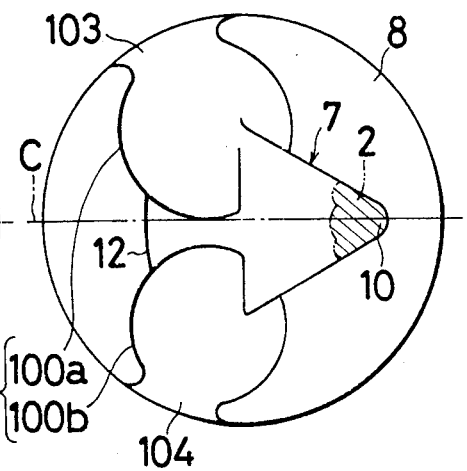
FIG. 13 is a view showing a relative positional relation among a cocavity, valve recesses and other portions in correspondence with FIG. 11.

On the other hand, in the FIG. 13 showing another embodiment about a relative arrangement between the concavity 7 and the valve recesses 100, with differing from the seventh embodiment, the inlet end 10 of the concavity 7 is located on the center line C of the piston head 8, and the intake valve recess 100a and the exhaust valve recess 100b are respectively provided with the edge portions 103, 104 cut out at the peripheral edge 8a of the piston head 8. Hence, this embodiment solves the problem that the edge portions 103, 104 are apprehended to generate heat points owing to their sharp edges formed in the seventh embodiment.

Figure 14:
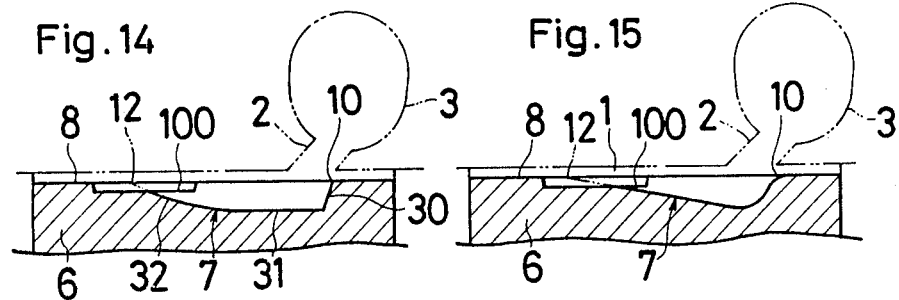
FIGS. 14 through 17 are views showing respectively other embodiments of the concavity in the case of the piston head provided with valve recesses.
Figure 15:
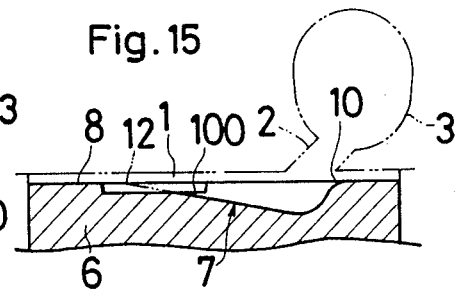
Figure 16:
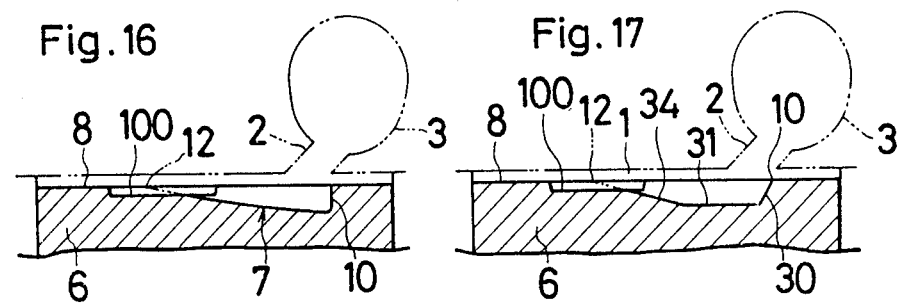
Figure 17:
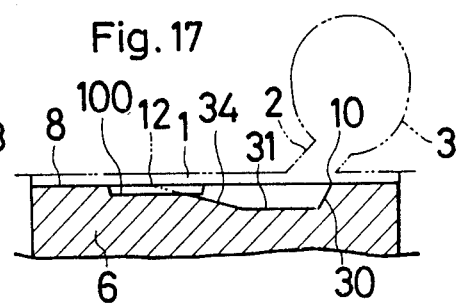

FIGS. 14 through 17 show the other embodiments having the valve recesses. FIG. 14 corresponds to the second embodiment, FIG. 15 does to the third one, FIG. 16 does to the fifth one, and FIG. 17 does to the fourth one respectively.

On the other hand, the relative positional relation between the injection passage 2 and the concavity 7 is not only limited to one embodiment but may be varied to many types of embodiments.

Figure 18:
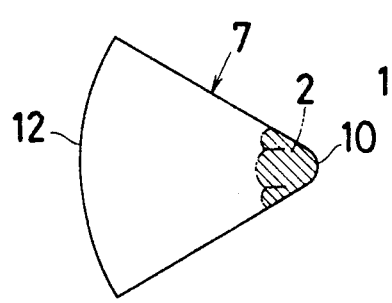
FIGS. 18 through 20 are views showing respectively embodiments of relative relations between the spreading directions of combustion gas injected from the injection passage and the concavity.

FIG. 18 shows other embodiment of the concavity 7, wherein the inlet end 10 thereof is aligned with the outlet of the injection passage 2 and the spread angle thereof is in accord with that of the stream of combustion gas injected from the passage.

Figure 19:
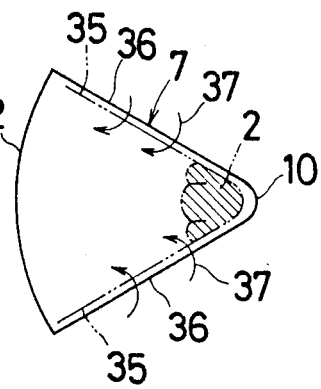

In FIG. 19 showing other embodiment having the concavity 7 whose spread angle is settled under the same condition as in FIG. 18, the outlet of the injection passage 2 is positioned a little forwards with respect to the inlet end 10 of the concavity 7. Since the stream of combustion gas injected from the passage 2 is to flow through with its opposite side edges 35 being spaced a little inwards from the opposite side edges 36 of the concavity 7, vacuum pressure is to be produced adjacently along the outside of the side edges 35. Accordingly, air 37 is to be sucked into the concavity 7 through the side edges 36 so as to facilitate more effectively the mixing with the stream of combustion gas in the main combustion chamber 1.

Figure 20:
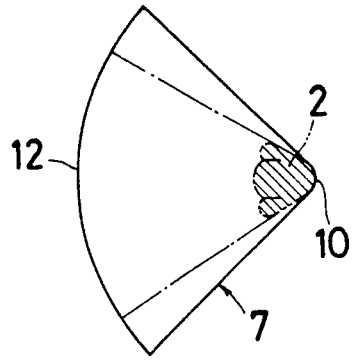

FIG. 20 shows such an unfolded-fan shaped concavity 7 as having a spread angle settled a little larger than that of the combustion gas stream. As for the configuration of the concavity 7 which gradually spreads forwardly on both sides thereof, not only the shape of a folded-fan but also, for example the shape of a triangle, a crescent or leaf of ginkgo, etc. can be applied thereto.

Further, the injection passage 2 may have only such a basic configuration as it guides the stream of combustion gas so as to gradually spread right and left, that is, such an injection passage is enough as to gradually spread the stream of combustion gas right and left as progressing to the main combustion chamber.

Figure 21:
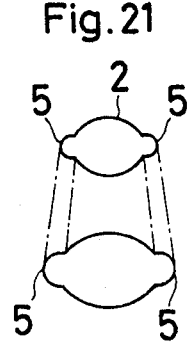
FIGS. 21 through 24 are views showing other embodiments of injection passage.
Figure 22:
Figure 23:
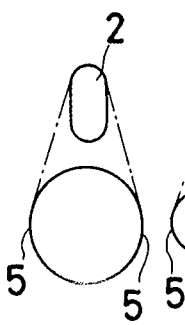
Figure 24:

Accordingly, besides the first embodiment, the following variations can be applied to the injection passage 2, for example which comprising a main passage of an elliptical cylinder and side channels connected to said main passage at the laterals thereof as shown in FIG. 21, having elongate holes of which longitudinal directions coincide with each other respectively at the upper and the lower ends as shown in FIG. 22, having respectively an elongate hole at the upper end and a circular hole at the lower end as shown in FIG. 23, and having a transversely elongate hole and a longitudinal elongate hole of which longitudinal directions are crossed each other, respectively at the upper and the lower ends as shown in FIG. 24.

Although the invention has been disclosed in relation to preferred embodiments thereof, it will become apparent to those skilled in the art that numerous modifications and variations can be made within the scope and spirit of the invention as defined by the attached claims.

We claim:

1. In a swirl chamber type combustion chamber for a Diesel engine having a swirl chamber connected to a main combustion chamber through an injection passage provided at an offset position with respect to the main combustion chamber for injecting combustion gas into said combustion chamber, said injection passage having right and left sides, an inlet opening into said swirl chamber and an outlet, the longitudinal axis of said passage being directed obliquely to the main combustion chamber, the right and left sides of said injection passage being formed so as to gradually spread the lateral portions of the stream of combustion gas, expanded in the swirl chamber, at an angle gradually spreading towards the main combustion chamber, comprising: a piston head in said chamber defining a concavity which guides the stream of combustion gas injected from the swirl chamber into the main combustion chamber at the top dead center of the piston stroke, said concavity being formed in a substantially triangular configuration with an inlet end and an outlet end and configured spreading right and left progressing from the inlet end to the outlet end thereof, the inlet end of said concavity being located to face the outlet of the injection passage.

2. A swirl chamber type combustion chamber defined in claim 1, further comprising valve recesses provided in the piston head overlapping partially with the concavity to avoid interference between the piston head and intake and exhaust valves.

3. A swirl chamber type combustion chamber defined in claim 1 wherein the inlet end of concavity has a back wall defining a concaved surface in the longitudinal vertical section thereof.

4. A swirl chamber type combustion chamber defined in claim 1, wherein the inlet end of the concavity has a flat back wall inclined backwards in the longitudinal vertical section thereof.

5. A swirl chamber type combustion chamber defined in claim 1, wherein the inlet end of the concavity has a back wall formed vertically straight in the longitudinally vertical section thereof.

6. A swirl chamber type combustion chamber defined in claim 1, wherein the inlet end of the concavity defines a rounded edge with the piston head.

7. A swirl chamber type combustion chamber defined in claim 3, wherein the area between the inlet end and the outlet end of the concavity is formed like a flat ramp way ascending forwardly in the longitudinal direction thereof.

8. A swirl chamber type combustion chamber defined in claim 4, wherein the area between the inlet end and the midportion of the concavity is formed horizontally at the same depth in the longitudinal vertical section thereof.

9. A swirl chamber type combustion chamber defined in claim 8, wherein the area between the midportion and the outlet end of the concavity is concave in the longitudinal vertical section thereof.

10. A swirl chamber type combustion chamber defined in claim 8, wherein the area between the midportion and the outlet end of the concavity is a flat ramp way ascending forwardly in the longitudinal direction thereof.

11. A swirl chamber type combustion chamber defined in claim 1, wherein the concavity is formed to progressively descend from the inlet end to the midportion, being deepest at the midportion, and to progressively ascend from the midportion to the outlet end.

12. A swirl chamber type combustion chamber defined in claim 3, wherein the concavity is formed in the shape of an unfolded fan in a plan view.

13. A swirl chamber type combustion chamber defined in claim 3, wherein the concavity is formed in the shape of a leaf of ginkgo in a plan view.

14. A swirl chamber type combustion chamber defined in claim 3, wherein the horizontal spreading direction of the concavity is parallel to that of the stream of combustion gas.

15. A swirl chamber type combustion chamber defined in claim 3, wherein the horizontal spreading direction of the concavity is wider than that of the stream of combustion gas.

* * * * *